(12) United States Patent
Foote et al.

(10) Patent No.: US 6,829,772 B2
(45) Date of Patent: Dec. 7, 2004

(54) APPARATUS AND METHODS FOR COMMUNICATING BETWEEN RESOURCE DOMAINS

(75) Inventors: William F. Foote, Los Angeles, CA (US); Hideya Kawahara, Mountain View, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 612 days.

(21) Appl. No.: 09/727,103

(22) Filed: Nov. 29, 2000

(65) Prior Publication Data

US 2001/0029552 A1 Oct. 11, 2001

Related U.S. Application Data (60) Provisional application No. 60/168,221, filed on Nov. 30, 1999.

(51) Int. Cl.$^7$ ............................................. G06F 9/46
(52) U.S. Cl. ...................... 719/330; 718/102; 718/103; 718/104; 717/166; 717/167; 713/167
(58) Field of Search ............................. 709/100–108, 709/313–318, 330; 719/311–318

(56) References Cited

U.S. PATENT DOCUMENTS

| | | | | | |
|---|---|---|---|---|---|
| 5,241,673 | A | * | 8/1993 | Schelvis | ................. 707/103 R |
| 2003/0069922 | A1 | * | 4/2003 | Arunachalam | .............. 709/203 |

OTHER PUBLICATIONS

McCullough P "Transparent Forwarding: First Steps" System Concepts Laboratory Xerox Palto Alto Research Center/Northwest Oct. 1987 pp. 331–341.*
Hawblitzel C "Implementing Multiple Protection Domains in Java" Cornell University Technical Report 97–1660 1997 pp. 1–15.*
Czajkowski, Grzegorz, et al., "*JRes: A Resource Accounting Interface for Java,*" In Proceedings of the 1998 ACM OOPSLA Conference, Vancouver, BC, Oct. 1998.
Philippe Bernadat, Laura Feeney, Dan Lambright, and Franco Travostino, "*Java Sandboxes meet Service Guarantees: Secure Partitioning of CPU and Memory,*" Dec. 14, 1998, 24 pp.
Chris Hawblitzel, Chi–Chao Chang, Grzegorz Czajkowski, Deyu Hu, and Thorsten von Eicken, "*Implementing Multiple Protection Domains in Java,*" Technical Report 97–1660, Department of Computer Science, Cornell University, 15 pp.
William F. Foote, et al, "Terminating A Group Of Related Threads By Modifying The Prog Ram Counter Of Selected Stack Frames," U.S. patent application No.: 09/536,253, filed Mar. 27, 2000, 32 pages.
William F. Foote, "Apparatus And Methods For Preventing Denial Of Service Attacks", U.S. patent application No. 09/394,121, filed Sep. 10, 1999, 42 pages.

(List continued on next page.)

*Primary Examiner*—Meng-Al T. An
*Assistant Examiner*—Charles E. Anya
(74) *Attorney, Agent, or Firm*—Beyer,Weaver & Thomas, LLP; Mary Ramos Olynick, esq.

(57) ABSTRACT

Disclosed is a method for executing a remote method. Each argument of the remote method is wrapped when the argument is a remote object (e.g. the argument's declared class implements a remote marker interface). However, each argument of the remote method is copied when an argument is not a remote object. The remote method is invoked using the wrapped or copied argument(s) (e.g. the wrapped or copied arguments are passed to the invoked method). A result of the invoked remote method is then wrapped (e.g., prior to being passed to the process that is receiving the result) when the result is a remote object (e.g., the result's declared class does not implement the remote marker interface). In contrast, the result of the remote method is copied (e.g., the copy is then passed to the process that is receiving the result) when the result is are remote object.

27 Claims, 6 Drawing Sheets

OTHER PUBLICATIONS

William F. Foote, "Apparatus And Methods For Managing Resource Usage," U.S. patent application 09/394,118, filed Sep. 10, 1999, 36 pages.

William F. Foote and Hideya Kawahara "Apparaus and Methods for Managing Resources for Resource Constrained Devices", U.S. patent application No. 10/045,514, filed Oct. 26, 2001, 35 pages.

Hideya Kawahara, William F. Foote, and Dean R.E. Long, "Clean Thread Termination", U.S. patent application No. 09/846,064, filed Apr. 30, 2001, 25 pages.

Binder, Walter *Design and Implementation of the J–SEAL2 Mobile Agent Kernel*, Application and the Internet, 2001.

Chan, Patrick, et al. The Java Class Library, Second Edition, vol. 1 (pp. 1723–1750) "1998".

* cited by examiner

APPARATUS AND METHODS FOR COMMUNICATING BETWEEN RESOURCE DOMAINS

CROSS REFERENCE TO RELATED APPLICATIONS

This application claims priority to U.S. Provisional Application No. 60/168,221 entitled APPARATUS AND METHODS FOR COMMUNICATING BETWEEN RESOUCE DOMAINS filed Nov. 30, 1999 by Foote et al. This application is related to co-pending U.S. patent application Ser. No. 09/394,118 (Attorney Docket SUN1P250) entitled, "APPARATUS AND METHODS FOR MANAGING RESOURCE USAGE" filed Sep. 10, 1999 by William F. Foote and U.S. patent application Ser. No. 09/394,121 (Attorney Docket SUN1P219) entitled, "APPARATUS AND METHODS FOR PREVENTING DENIAL OF SERVICE ATTACKS" filed Sep. 10, 1999 by William F. Foote. These applications are incorporated herein by reference in their entirety for all purposes.

BACKGROUND OF THE INVENTION

The invention relates generally to software applications and, more particularly, to methods and apparatus for managing resource usage in an object-based system.

In the consumer field, there is intense pressure to keep costs down. Thus, the capabilities of memory and CPU devices within consumer systems, for example, are scaled down as much as possible to minimize overall costs. For example, cable television set top boxes typically include limited memory space and CPU capabilities. As object-based systems are integrated within consumer devices, it is becoming more important to manage resource usage effectively within the object-based systems. In other words, as a result of limited resources (among other reasons), a major issue within the object-oriented field is how to track and manage resource usage.

It is especially important to track resource usage of untrusted code. For example, it is important to track the resource usage of an applet that is downloaded from an untrusted URL into a set top box. The downloaded applet may be maliciously or unintentionally designed to consume an inordinate amount of resources, such as memory space or CPU time.

It is also important to track and manage resource usage of sets of related code. For example, the threads executed on behalf of an applet may together or individually consume too much of a limited resource of the set top box. Thus, it is not enough to simply track and manage the resource usage of individual threads. For example, an applet may initiate multiple threads that work together to consume resources. Tracking resource usage of individual threads only allows one to kill an individual thread. However, prior to killing a resource consuming thread, an applet may launch another resource consuming thread.

Accordingly, there is a need for improved methods and apparatus for tracking and managing resource usage. Additionally, there is a need for mechanisms for tracking and managing resource usage for sets of related code. Several mechanisms for managing resources are described in the above referenced co-pending U.S. patent application Ser. No. 09/394,118. Specifically, a resource context structure (herein referred to as a "logical Virtual Machine or logical VM") is created and updated for each set of codes that can share the same objects. The logical VM generally provides a mechanism for referencing the codes from one or more computer programs that can share the same resource or object. Thus, the code of any currently executing thread will be associated with a particular logical VM. Associating threads with a particular logical VM allows the related threads to be terminated together when they start to misbehave (e.g., by causing a denial of service attack).

However, currently there is also a need for mechanisms to allow code in different logical VM's to communicate with each other. More specifically, there is a need for communication between a first and a second logical VM without inhibiting a termination procedure from being performed on code associated with the terminating logical VM and/or without adversely affecting execution of code of the non-terminating logical VM. Additionally, there is a need for mechanisms that allow termination of code associated with a first logical VM without requiring any cooperation from the terminating code of the first logical VM or from any other code of a second logical VM.

SUMMARY OF THE INVENTION

Broadly speaking, the present invention fills these needs by providing apparatus and methods for a set of related code to communicate with another set of related code. Preferably, such communication does not inhibit termination of any threads from either set of related code. Additionally, it is preferred that execution of the non-terminating related code set is not detrimentally affected by the termination of the other related code set.

In one embodiment, a method for executing a remote method is disclosed. Each argument of a remote method is either wrapped or copied. Arguments that are remote objects (e.g., instances of classes that are declared as "remote") are wrapped, whereas other arguments are copied. When a method is invoked on such a wrapped remote object, it is executed as a remote method. Preferably, an argument that is a remote object is wrapped by generating a stub class for the argument, where an instance of the stub class references the argument.

The remote method is invoked using the wrapped or copied argument(s) (e.g., an instance of a stub class for each of the arguments are used by the invoked method). A result of the remote method is then wrapped (e.g., prior to being used by the process that has invoked the remote method) when the result is a remote object. In contrast, the result of the remote method is simply copied (e.g., prior to being used by the process that is receiving and using the result) when the result is not a remote object.

In one implementation, the result is only wrapped or copied when an invocation thread associated with invoking the remote method is not being terminated. Otherwise, an exception is thrown on the remote method when the invocation thread is terminated.

In one aspect, wrapping the argument or the result generally includes creating a wrapper object for the argument or the result and remembering an association between the wrapper object and the argument or the result when a wrapper object has not already been created. In this aspect, wrapping also includes finding the wrapper object for the argument or the result based on a previous association between the argument or the result and the wrapper object when the wrapper object has already been created. In a specific implementation creating the wrapper object for the argument or the result includes finding or generating a remote stub class, creating an instantiation of the remote stub class, and setting a data member within the remote stub class to refer to the argument or the result.

In a further implementation, generating the remote stub class includes generating a class name, adding a method implementation for each method of a class of the argument or result being wrapped into a class definition array, and remembering an association between the class and the remote stub class. In yet another further implementation, finding the remote stub class is based on a previously remembered association between a class of the object being wrapped and the remote stub class.

In another aspect, copying each argument or result includes serializing each argument or result into a byte array when the argument or result implements serialization. The serialized argument or result is then deserialized by the code that will use the copy (e.g., the Logical VM that receives the copy) with respect to a target class loader associated with such code. Preferably, copying each argument or result also includes implementing a failure process when the each argument or the result does not implement serialization.

In another embodiment, the invention pertains to a computer readable medium containing computer codes for executing a remote method. The computer readable medium includes computer code for performing one or more of the above described method embodiments.

These and other advantages of the present invention will become apparent upon reading the following detailed descriptions and studying the various figures of the drawings.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE EMBODIMENTS

Reference will now be made in detail to specific embodiments of the invention. While the invention will be described in conjunction with specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The above referenced U.S. patent Ser. No. 09/394,118 describes methods and apparatus for managing resource usage among related code, such as code executed on behalf of an applet that is downloaded from a particular web site. Related code may include any code that may logically be charged as a single entity for its resource usage. For example, related code may include threads or methods that are directly executed by the applet as part of the downloaded code and/or threads on methods that are initiated by the applet. For instance, a system method may be called by an applet method. Related code may also include code executed on behalf of multiple applets from a same source (e.g., web site) or from related sources (e.g., sites owned by the same company). Related code may also take forms other than applets.

For simplicity, the code executed on behalf of an applet will be used throughout the specification as an example of related code. Of course, the mechanisms of the present invention may be applied to any other type of related code besides applets. In the illustrated embodiment, resource usage is tracked for each applet. For example, the total memory consumption of an applet may be tracked and managed. By way of another example, the CPU time taken by an applet for a particular duration of time (e.g., CPU time as a percentage of the time period) may also be tracked and managed.

Resource usage is also tracked by associating some kind of indicator with each applet. The indicator is used to track how much of a particular resource is consumed by the applet. Particular resource objects may also be associated with a responsible applet. A resource object is generally defined as any suitable resource that may consumed or used by a particular applet. Examples of resource objects include memory blocks, CPU time, and one or more sockets. Any suitable factors may be considered to determine which applet or set of applets is responsible for a particular resource object. For example, when a memory block is allocated on behalf of an applet, that applet is deemed responsible for that memory block and is then associated with the allocated memory block. Several embodiments of mechanisms for associating a resource object with a responsible set of related code are outlined below with references to FIG. 1.

After a resource object is associated with a responsible applet, the appropriate resource indicators of the applet may then be updated after the resource object is allocated for the applet's use and after the resource object is deallocated from the applet. For example, when a memory block is allocated for an applet's use, the applet's memory counter is incremented by the size of the allocated memory block. When the same memory block is deallocated for the applet's use, the applet's memory counter is decremented by the size of the deallocated memory block.

In the illustrated embodiment, mechanisms that are used for tracking resource usage of a applet may be represented in the form of a logical VM. The logical VM is an entity against which that resource usage may be charged when code that is associated with the logical VM utilizes a resource. In other words, a logical VM is an entity through which resource usage of related code (e.g., an applet) can be tracked and managed. A logical VM may also be associated with a body of code (e.g., such as an applet) and the resources (e.g., memory, cpu usage) consumed by the execution of such body of code.

Figure 1:
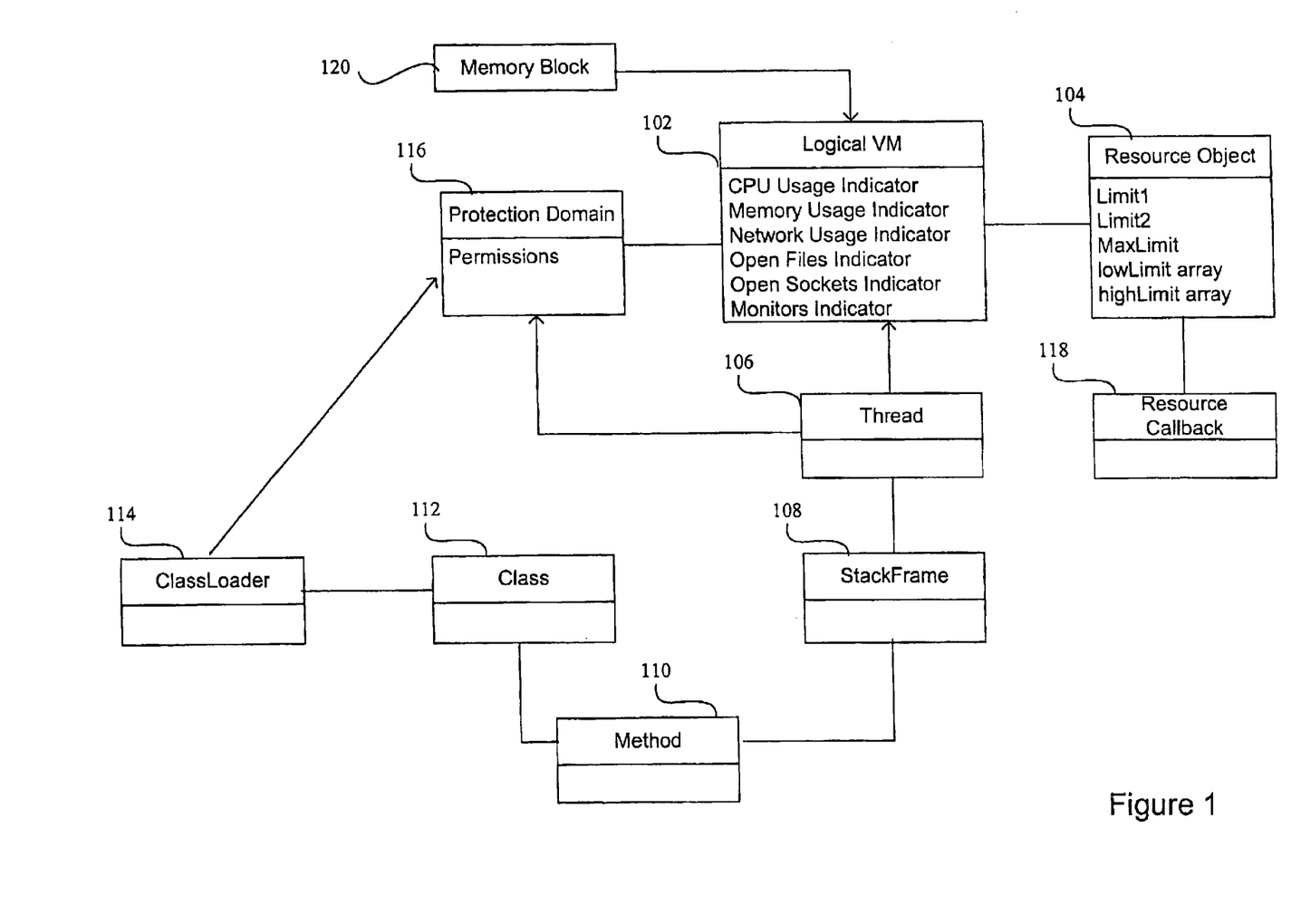
FIG. 1 is a diagrammatic representation of the relationships between mechanisms for managing resource usage in accordance with one embodiment of the present invention.

FIG. 1 is a diagrammatic representation of the relationships between various mechanisms for managing resource usage in accordance with one embodiment of the present invention. As shown, a logical VM 102 includes a set of indicators for tracking how much of each resource type that the logical VM is consuming. In one embodiment, the indicators track CPU usage, memory usage, network usage, number of open files, number of open sockets, and number of monitors. Of course, any other suitable type of resource may also be tracked through an associated indicator.

As illustrated, the logical VM 102 is associated with a resource object 104 that includes a plurality of memory usage limits or thresholds: limit1, limit2, MaxLimit, a lowLimit array, and a highLimit array for a particular resource type (e.g., memory). Although it is not shown, the logical VM may be associated with any number of resource objects (e.g., a resource object for each of the following resources: CPU usage, network usage, socket usage, file usage, and monitor usage). Additionally any number and kind of memory limits or threshold indicators may be associated with a particular resource object. Several embodiments of such limit and threshold indicators are described further in the above reference co-pending U.S. patent application Ser. No. 09/394,118.

Any mechanism may be implemented for notifying the applet that memory is about to be exceeded or no longer about to be exceeded. In the illustrated embodiment, the resource object 104 has access to a resource callback 118. A resource object gains access to a resource callback when an application registers and indicates a desire to be notified of resource usage. When a threshold is exceeded or when a same or other threshold is no longer exceeded, a callback is initiated for registered users.

The logical VM is associated with a particular set of related code. This association may occur in any suitable manner. For example, the application framework that receives application code sets may predetermine the assignment of logical VMs to particular sets of related code. This determination may be based on any suitable policy considerations. For instance, all the code that is assigned to a particular protection domain may be assigned to a single logical VM. As will be appreciated by those skilled in the art, a protection domain (which feature is included within the security features of JDK 1.2) generally accords permissions to a set of code. In other words, the mechanisms for assigning a protection domain to a particular set of code may be leveraged to assign a logical VM to the same set of code.

A protection domain is generally associated with a particular thread based on which classloader was used to load the class of the method being executed by that particular thread. Several embodiments for assigning protection domains to threads based on classloader are described in *Java 2 Platform Security Architecture, API Design, and Implementation* by Li Gong (published by Addison Wesley, ISBN 0-201-31000-7), which text is herein incorporated by reference in its entirety.

As shown in FIG. 1, a particular thread 106 that is executing on behalf of logical VM 102 is also executing within protection domain 116. More specifically, a particular method 110 of the thread 106 is currently being executed, and the method 110 is associated with a corresponding stackframe 108. The currently executing method 110 of the thread 106 is loaded as part of a class 112 by classloader 114. Classloader 114 is associated with protection domain 116 that may then be associated with logical VM 102. In one embodiment, each thread may be assigned to and traced to an associated logical VM through a classloader and its associated protection domain.

Of course, several sets of code that belong to different protection domains may be assigned to a same logical VM. For example, a first applet may originate from a Pepsi controlled web site, and a second applet may originate from a Pizza Hut controlled web site. Although the two applets may have different protection domains since they originate from different web sites and are loaded by different class loaders, one may wish to charge resource usage against a same logical VM since Pizza Hut and Pepsi are commonly owned.

When a particular set of related code belonging to a same logical VM exceeds its maximum memory usage, mechanisms may be also implemented to abort the threads executing on behalf of the related code. Several embodiment for aborting related threads are described further in the above referenced U.S. patent application Ser. No. 09/394,121.

Since threads associated with a particular logical VM may be terminated when such logical VM is consuming too much of a resource, any communication between the terminating logical VM and another logical VM preferably does not interfere with such termination procedure. For example, it is preferable that the termination of the particular logical VM does not require cooperation of the code executing in the other logical VM. Additionally, code from the other logical VM is preferably not adversely affected when the particular logical VM is terminated.

In general terms, the present invention provides mechanisms for code executing in a first logical VM to communicate with code executing in a second logical VM. Code executing in one process can invoke methods on objects that reside in a different logical VM process. Remote invocation does not interfere with termination of threads from a different misbehaving logical VM. Preferably, termination of a logical VM does not substantially interfere with code that is utilizing objects of a terminating logical VM. Accordingly, any suitable communication mechanism may be implemented that inhibits direct object sharing between code in separate untrusted logical VM's. This prohibition does not apply to trusted (e.g., system code), however.

Objects are passed between two logical VMs in two ways: copy-by-value and copy-by-reference. In copy-by-value, a copy of the object is directly provided as a parameter to a method invocation in a technique similar to the Java platform's Remote Method Invocation (RMI) API's copy-by-value technique for serializable objects. In copy-by-reference, a remote object is "wrapped." Stubs which hold a direct reference to remote objects are automatically generated during runtime. This technique is in contrast to the RMI stub generation process, which creates a stub by a tool "rmic." Additionally, the RMI stubs are very network-centric, so they are not suitable for inter-logical VM communication.

Figure 2:
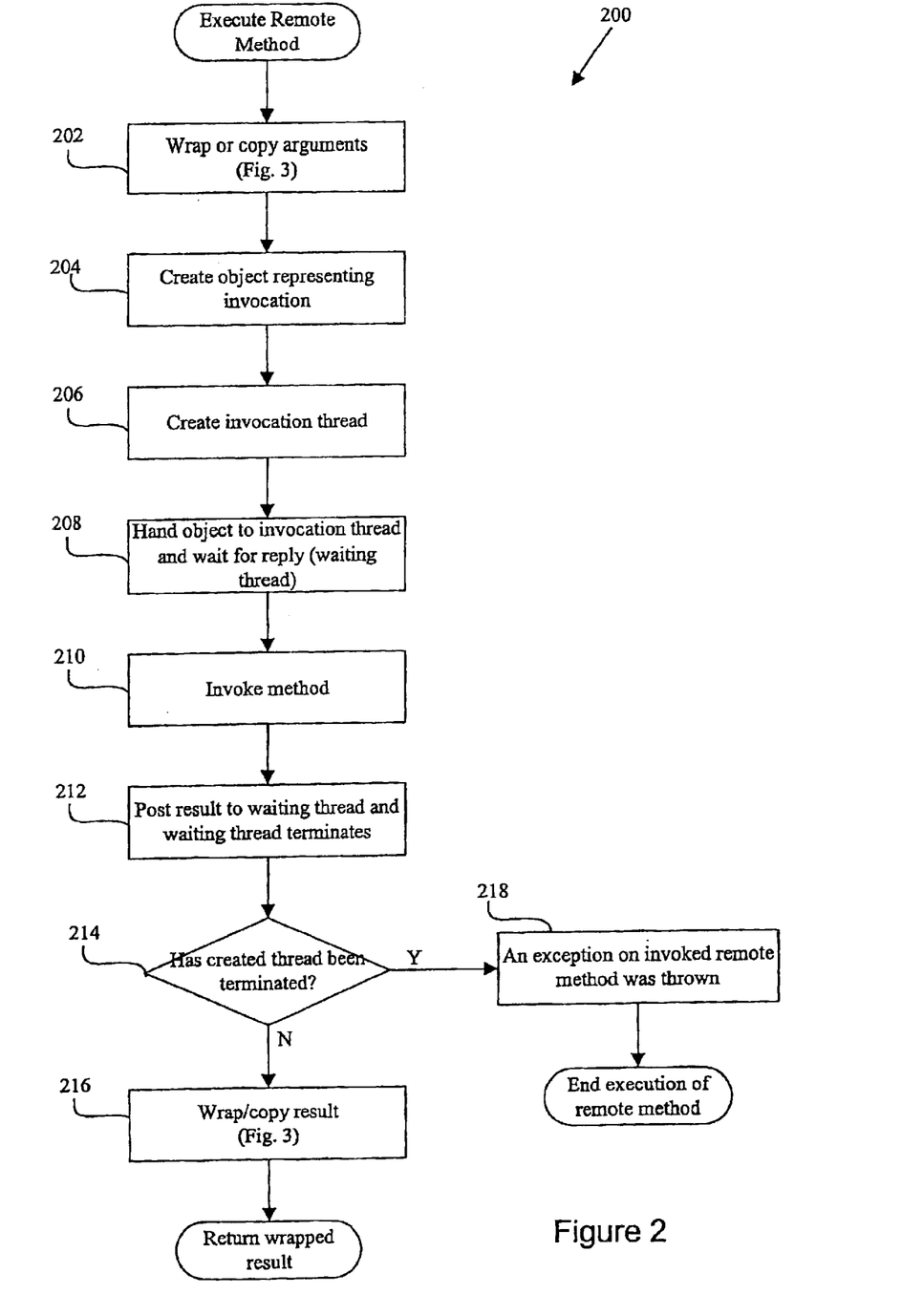
FIG. 2 is a flowchart illustrating a procedure for executing a remote method in accordance with one embodiment of the present invention.

FIG. 2 is a flowchart illustrating a procedure 200 for executing a remote method in accordance with one embodiment of the present invention. Specifically, code associated with a first logical VM (referred to herein as the "invoking logical VM") is invoking a method associated with a second logical VM (referred to herein as the "invoked logical VM"). Initially, arguments for the method to be invoked are each wrapped or copied in operation 202. That is, each argument is wrapped (copy-by-reference) or copied (copy-by-value). Any suitable technique may be implemented for wrapping or copying each argument so that termination of either logical VM (the invoking or invoked logical VM) may occur without inhibition and without causing problems for other methods within logical VMs that are invoking terminating methods. One technique for wrapping or copying an object is described below with reference to FIG. 3.

After each argument is wrapped or copied, an object representing the invocation is then created in operation 204. For example, the created object references a method object and an array of arguments. An invocation thread is then created in operation 206. The created object is then handed to the created invocation thread in operation 208. A "waiting" thread then waits for a reply from the invocation thread in operation 208 (e.g., waits for the result output from the invoked method). Meanwhile, the invocation thread invokes the remote method in operation 210. The result of the invoked method is then posted to the waiting thread (e.g., the waiting thread of operation 208) and the waiting thread terminates in operation 212.

It may then be determined what to do with the posted results. Since the invocation thread may have been terminated, it is first determined whether the created invocation thread has been terminated in operation 214. For example, the invocation thread may be associated with a logical VM that has associated misbehaving threads or the invocation thread may itself be misbehaving. In this case, execution of the remote method is also terminated since it is a part of the logical VM being terminated.

If the invocation thread has not been terminated, the result (e.g., from the invoked method) is wrapped or copied in operation 216. The procedure for wrapping or copying the results is similar to the procedure used to wrap or copy the invoked method arguments (i.e., operation 202). Techniques for wrapping or copying an object are described below with reference to FIG. 3. The wrapped result is returned and the procedure 200 for executing the remote method ends. For example, the obtained wrapped or copied results are then used by code associated with the invoking logical VM independently of the logical VM from which a method was invoked. In contrast, when the invocation thread has been terminated, an exception was then thrown in operation 218. When the invoked remote method is finished, the result is discarded. Execution of the remote method then ends.

Figure 3:
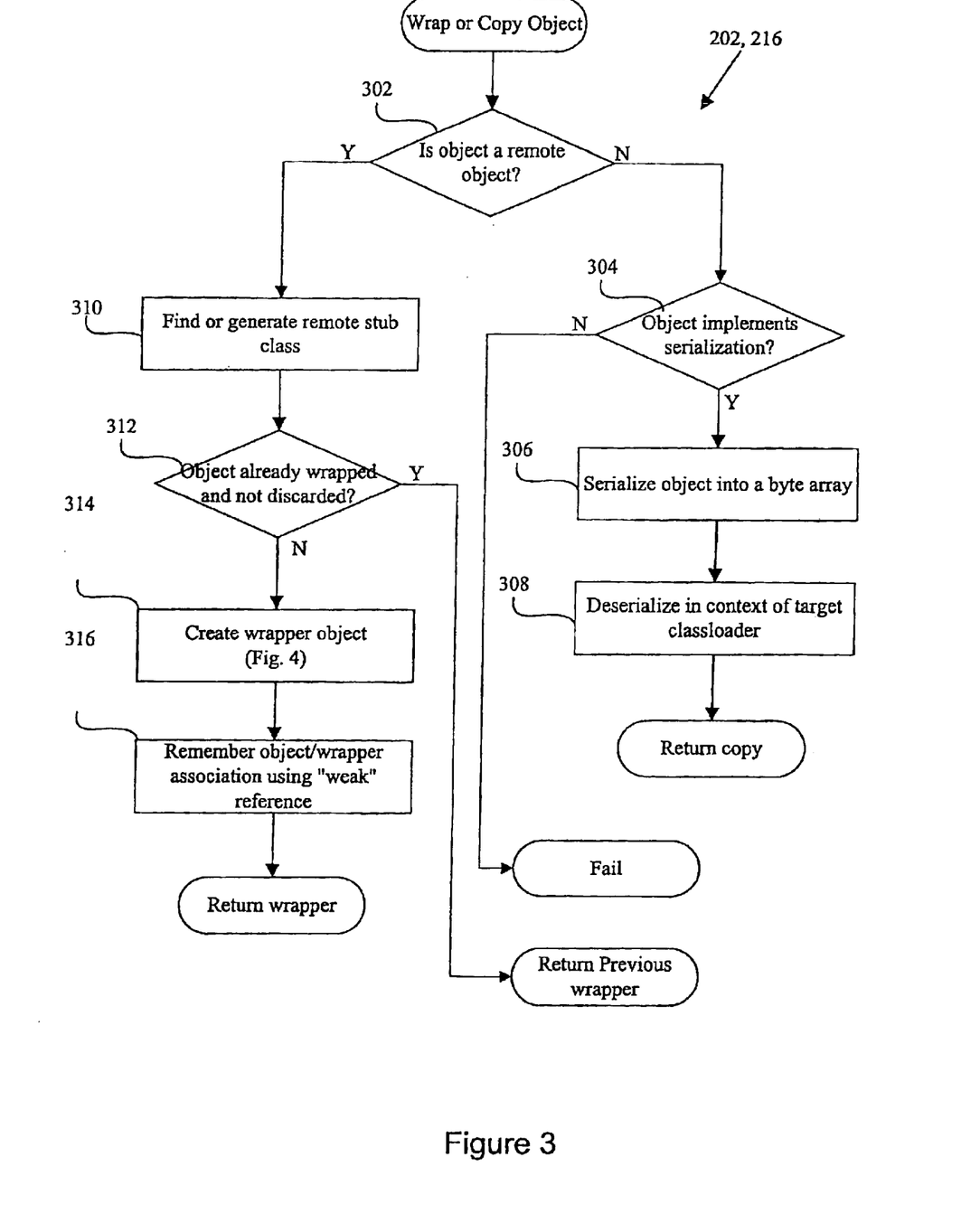
FIG. 3 is a flowchart illustrating the operations of FIG. 2 for copying or wrapping an object in accordance with one embodiment of the present invention.

FIG. 3 is a flowchart illustrating an operation for copying or wrapping an object (e.g., operations 202 and operation 216 of FIG. 2 for wrapping or copying arguments and for copying or wrapping a method result, respectively) in accordance with one embodiment of the present invention. Initially, it is determined whether the object is a remote object (e.g., its declared class implements a "marker" denoting a remote class) in operation 302. If the object is a remote object, it is then determined whether the object has previously been wrapped, and that wrapper has not yet been discarded in operation 312. If the object was already wrapped, the previous wrapper for this object (e.g., the method result) is returned. However if the object is not already wrapped, a wrapper object is then created in operation 314. An object and wrapper association is then remembered by using "weak" references in operation 316 (e.g., available within JDK 1.2). A weak reference allows garbage collection to occur for the reference when the object is no longer required (e.g., the application has ceased, or it no longer holds a reference to the object). The wrapper object is then returned (e.g., and used by the invoking method and application).

Some objects are not a remote type (e.g., the object type does not implement the remote marker interface); and, accordingly do not require wrapping. In this case, it is then determined whether the object implements serialization in operation 304. If the object implements serialization, the object is serialized into a byte array in operation 306. In one implementation, object serialization is performed in the same way as the Java Platform's Remote Method Invocation. That is, an object is serialized using the Java Platform's standard object serialization. The object is then de-serialized in the context of the target class loader (i.e., associated with the code that is going to use this object) in operation 308. A copy of the object is then returned (e.g., the result copy is then used by the invoking method and application). If the object does not implement serialization, the wrapping/copying procedure fails. For example, an error handling procedure is implemented.

Figure 4:
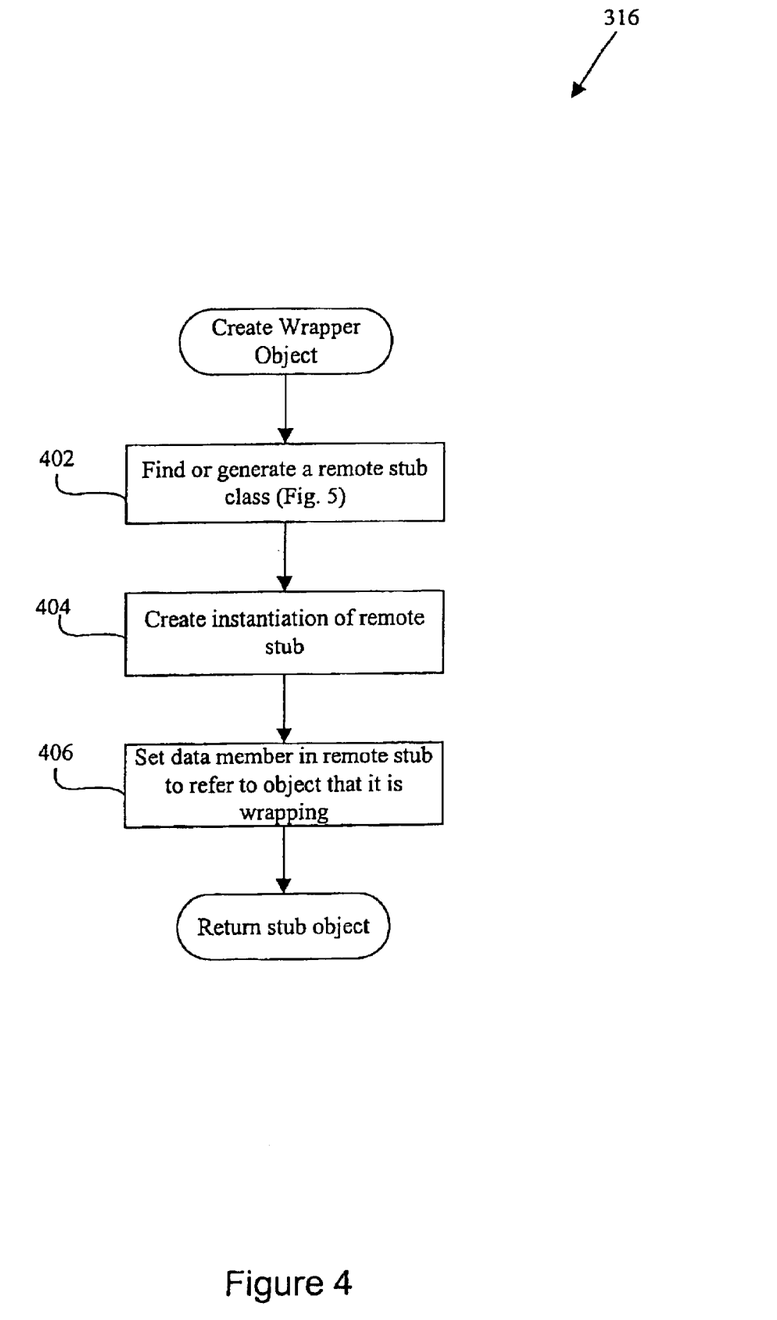
FIG. 4 is a flowchart illustrating the operation of FIG. 3 for creating a wrapper object in accordance with one embodiment of the present invention.

FIG. 4 is a flowchart illustrating the operation 316 of FIG. 3 for creating a wrapper object in accordance with one embodiment of the present invention. First, a remote stub class is found or generated in operation 402 (discussed further below with reference to FIG. 5). An instantiation of the remote stub is then created in operation 404. A data member within the remote stub is then set to refer to the object that is being wrapped in operation 406. The stub object is then returned, and the operation 316 for creating a wrapper object then ends.

Figure 5:
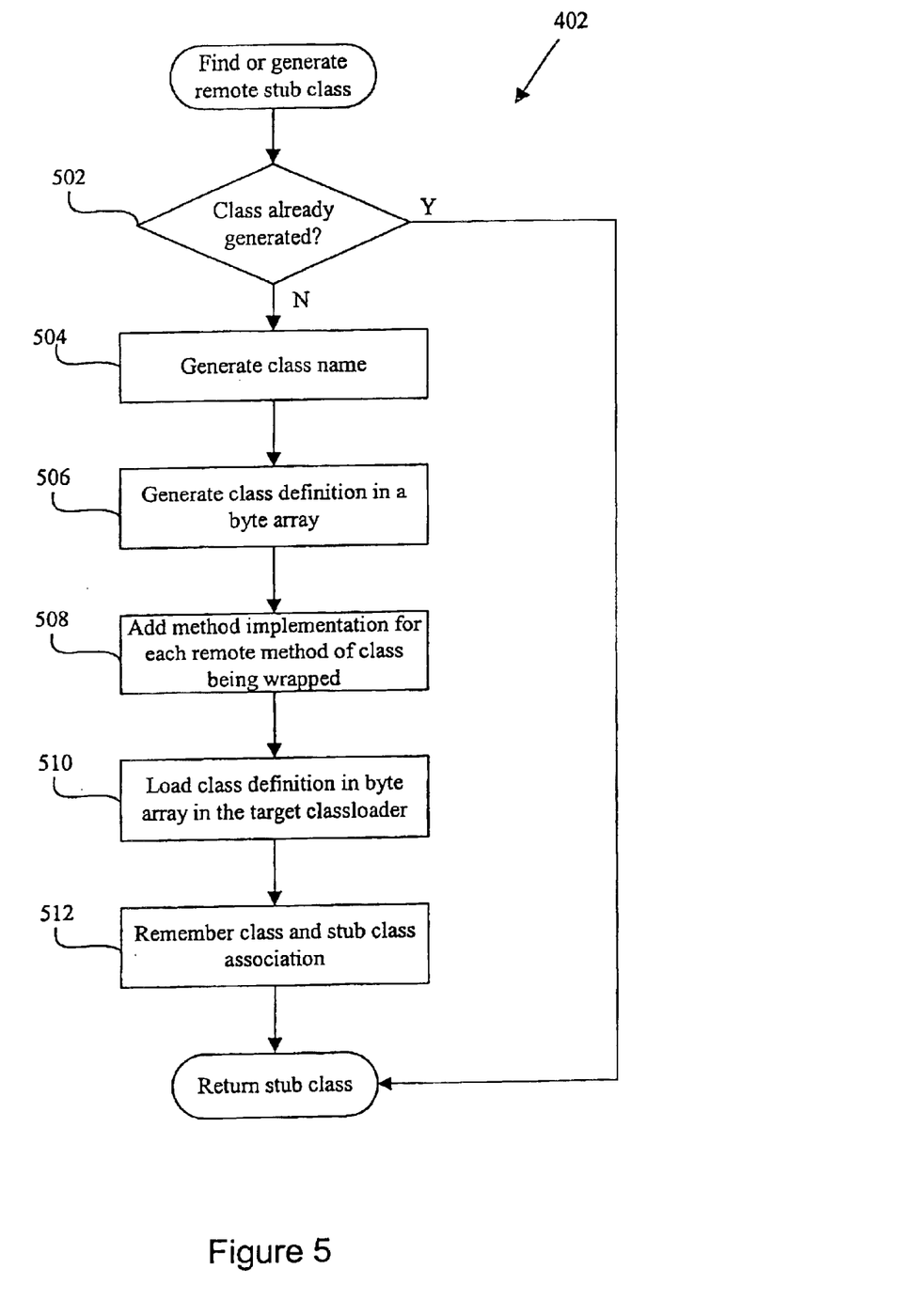
FIG. 5 is a flowchart illustrating the operation of FIG. 4 for finding or generating a remote stub class in accordance with one embodiment of the present invention.

FIG. 5 is a flowchart illustrating operation 402 of FIG. 4 for finding or generating a remote stub class in accordance with one embodiment of the present invention. Initially, it is determined whether the remote stub class is already generated in operation 502. If the class has already been generated, there is no need to generate a remote stub class. Accordingly, the found stub class is merely returned.

If the class has not been generated, a remote stub is generated in operation 504 through 512. Initially, a class name is generated in operation 504. For example, the class name "stub$$<n>" is used. A class definition is then generated in a byte array in operation 506. A method implementation for each method of the class being wrapped is then added to the class definition in operation 508 (e.g., each index of the definition array corresponds to a method implementation). The class definition is then loaded into the byte array in the target class loader in operation 510. This operation serves to create a Java class at runtime within the virtual machine, which class is ready to execute. The class and stub class association is then remembered in operation 512. This associate may later be used to find the sub class (e.g., operation 502). The generated stub class is then returned. For example, the wrapped argument(s) are used by the invoked remote method or the wrapped result is used by the invoking method.

Figure 6:
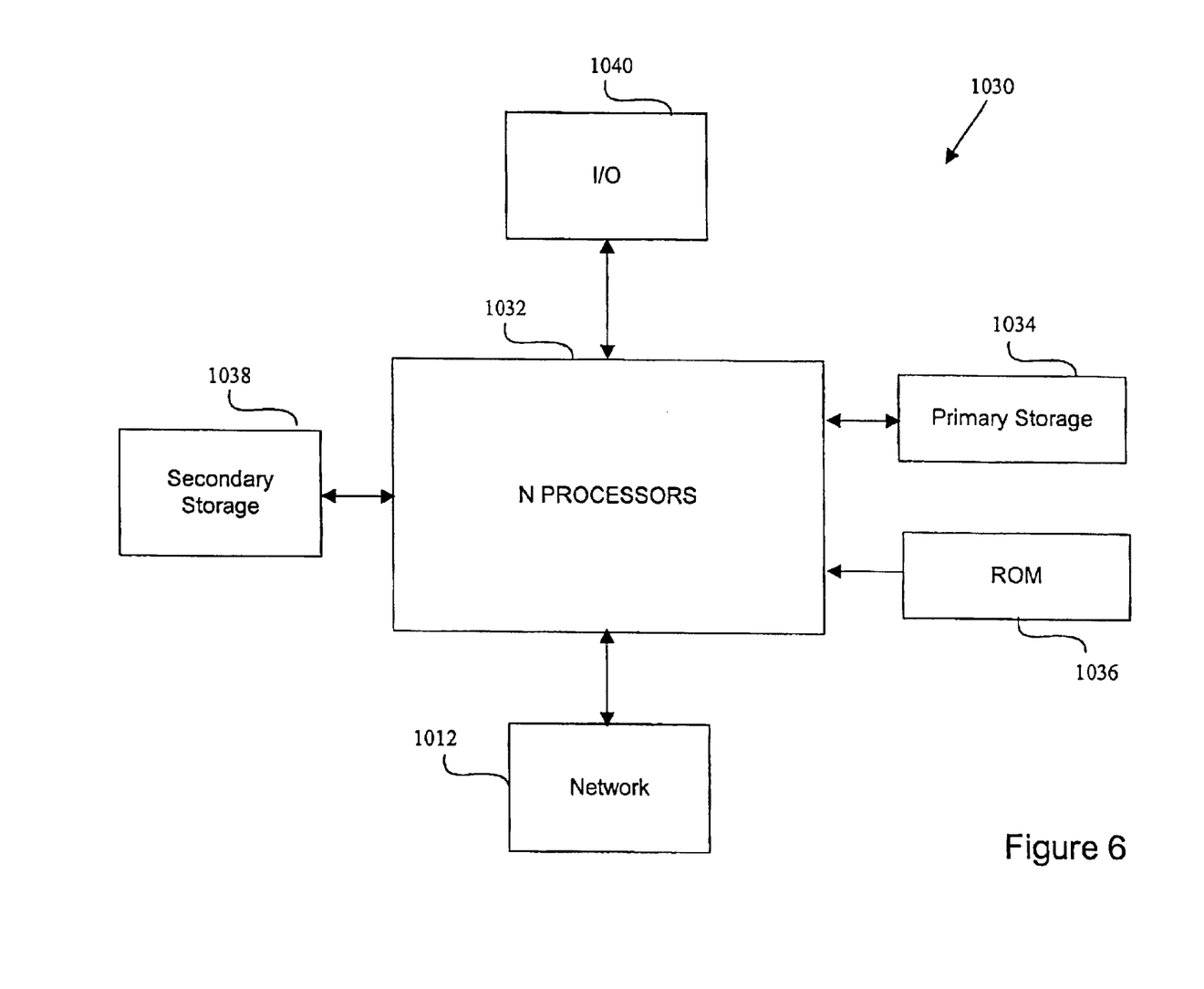
FIG. 6 illustrates a typical, general-purpose computer system suitable for implementing the present invention.

FIG. 6 illustrates a typical, general-purpose computer system suitable for implementing the present invention. The computer system 1030 includes any number of processors 1032 (also referred to as central processing units, or CPUs) that are coupled to memory devices including primary storage devices 1034 (typically a read only memory, or ROM) and primary storage devices 1036 (typically a random access memory, or RAM). The computer system may take any suitable form. For example, the computer system may be integrated with a navigational system or television set top box.

Computer system 1030 or, more specifically, CPUs 1032, may be arranged to support a virtual machine, as will be appreciated by those skilled in the art. As is well known in the art, ROM acts to transfer data and instructions uni-directionally to the CPUs 1032, while RAM is used typically to transfer data and instructions in a bi-directional manner.

CPUs 1032 may generally include any number of processors. Both primary storage devices 1034, 1036 may include any suitable computer-readable media. A secondary storage medium 1038, which is typically a mass memory device, is also coupled bi-directionally to CPUs 1032 and provides additional data storage capacity. The mass memory device 1038 is a computer-readable medium that may be used to store programs including computer code, data, and the like. Typically, mass memory device 1038 is a storage medium such as a hard disk or a tape which generally slower than primary storage devices 1034, 1036. Mass memory storage device 938 may take the form of a magnetic or paper tape reader or some other well-known device. It will be appreciated that the information retained within the mass memory device 1038, may, in appropriate cases, be incorporated in standard fashion as part of RAM 1036 as virtual memory. A specific primary storage device 1034 such as a CD-ROM may also pass data uni-directionally to the CPUs 1032.

CPUs 1032 are also coupled to one or more input/output devices 1040 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 1032 optionally may be coupled to a computer or telecommunications network, e.g., an Internet network or an intranet network, using a network connection as shown generally at 1012. With such a network connection, it is contemplated that the CPUs 1032 might receive information from the network, or might output information to the network in the course of performing the above-described mechanisms for managing resource usage. Such information, which is often represented as a sequence of instructions to be executed using CPUs 1032, may be received from and outputted to the network, for example, in the form of a computer data signal embodied in a carrier wave. The above-described devices and materials will be familiar to those of skill in the computer hardware and software arts.

Although only a few embodiments of the present invention have been described, it should be understood that the present invention may be embodied in many other specific forms without departing from the spirit or the scope of the present invention. By way of example, the operations involved with logical VM communication may be reordered. Steps may also be removed or added without departing from the spirit or the scope of the present invention.

Although the techniques for communication between logical VM's in accordance with the present invention are particularly suitable for implementation with respect to a Java™ based environment, the techniques may generally be applied in any suitable object-based environment. In particular, the techniques are suitable for use in platform-independent object-based environments. It should be appreciated that the methods may also be implemented in some distributed object-oriented systems.

Accordingly, the present embodiments are to be considered as illustrative and not restrictive, and the invention is not to be limited to the details given herein, but may be modified within the scope and equivalents of the appended claims.

What is claimed is:

1. A method for code from a first logical VM invoking a remote method of a second logical VM, the method comprising when code from a first logical VM is invoking a remote method of a second logical VM:

wrapping each argument of the remote method when each argument is determined to be a remote object, wherein the first logical VM is associated with a first set of related code that are to be terminated together if misbehaving and the second logical VM is associated with a second set of related code that are to be terminated together if misbehaving, the first set of related code differing from the second set of related code;

copying each argument of the remote method when each argument is determined not to be a remote object;

invoking the remote method using each wrapped or copied argument;

wrapping the result of the invoked remote method when the result is determined to be a remote object;

copying the result of the invoked remote method when the result is determined not to be a remote object;

returning the wrapped or copied result only when an invocation thread associated with invoking the remote method of the second logical VM is not being terminated; and throwing an exception on the remote method of the second logical VM when the invocation thread associated with invoking the remote method of the second logical VM is being terminated.

2. A method as recited in claim 1, wherein the argument or result is a remote object when its declared class implements a remote marker interface.

3. A method as recited in claim 1, wherein the result is only wrapped or copied when an invocation thread associated with invoking the remote method is not being terminated.

4. A method as recited in claim 3, wherein wrapping each argument and result includes:

creating a wrapper object for the argument or the result and remembering an association between the wrapper object and the argument or the result when a wrapper object has not already been created; and finding the wrapper object for the argument or the result based on a previous association between the argument or the result and the wrapper object when the wrapper object has already been created.

5. A method as recited in claim 4, wherein creating the wrapper object for each argument and the result includes:

finding or generating a remote stub class;

creating an instantiation of the remote stub class; and setting a data member within the remote stub class to refer to the argument or the result.

6. A method as recited in claim 5, wherein generating the remote stub class includes:

generating a class name;

adding a method implementation for each method of a class of the argument or result being wrapped into a class definition array; and remembering an association between the class and the remote stub class.

7. A method as recited in claim 6, wherein finding the remote stub class is based on a previously remembered association between a class and the remote stub class.

8. A method as recited in claim 1, wherein copying each argument and the result includes:

serializing each argument or the result into a byte array when the each argument or the result implements serialization;

deserializing the each argument or the result with respect to a target class loader associated with code that will use the copy of each argument or the result when the each argument or the result implements serialization;

implementing a failure process when the each argument or the result does not implement serialization.

9. A computer readable medium containing computer codes for executing a remote method, the computer readable medium comprising:

computer code for when code from a first logical VM is invoking a remote method of a second logical VM, wrapping each argument of the remote method when each argument is determined to be a remote object, wherein the first logical VM is associated with a first set of related code that are to be terminated together if misbehaving and the second logical VM is associated with a second set of related code that are to be terminated together if misbehaving, the first set of related code differing from the second set of related code;

computer code for wrapping each argument of the remote method when each argument is determined to be a remote object;

computer code for copying each argument of the remote method when each argument is determined not to be a remote object;

computer code for invoking the remote method using the wrapped or copied argument(s);

computer code for wrapping the result of the invoked remote method when the result is determined to be a remote object;

computer code for copying the result of the invoked remote method when the result is determined not to be a remote object; and computer code for returning the wrapped or copied result only when an invocation thread associated with invoking the remote method of the second logical VM is not being terminated; and computer code for throwing an exception on the remote method of the second logical VM when the invocation thread associated with invoking the remote method of the second logical VM is being terminated.

10. A computer readable medium as recited in claim 9, wherein the argument or the result is a remote object when its declared class implements a remote marker interface.

11. A computer readable medium as recited in claim 9, wherein the result is only wrapped or copied when an invocation thread associated with invoking the remote method is not being terminated.

12. A computer readable medium as recited in claim 11, wherein wrapping the argument or the result includes:

creating a wrapper object for the argument or the result and remembering an association between the wrapper object and the argument or the result when a wrapper object has not already been created; and finding the wrapper object for the argument or the result based on a previous association between the argument or the result and the wrapper object when the wrapper object has already been created.

13. A computer readable medium as recited in claim 12, wherein creating the wrapper object for the argument or the result includes:

finding or generating a remote stub class;

creating an instantiation of the remote stub class; and setting a data member within the remote stub class to refer to the argument or the result.

14. A computer readable medium as recited in claim 13, wherein generating the remote stub class includes:

generating a class name;

adding a method implementation for each method of a class of the argument or result being wrapped into a class definition array; and remember an association between the class and the remote stub class.

15. A computer readable medium as recited in claim 14, wherein finding the remote stub class is based on a previously remembered association between a class and the remote stub class.

16. A computer readable medium as recited in claim 9, wherein copying each of the argument or the result includes:

serializing each argument or the result into a byte array when the each argument or the result implements serialization;

deserializing each argument or the result with respect to a target class loader associated with code that is using the copy of each argument or the result when the each argument or the result implements serialization;

implementing a failure process when the each argument or the result does not implement serialization.

17. A computer system for executing a remote method, the computer system comprising:

a memory; and a processor coupled to the memory, wherein at least one of the memory and the processor are adapted for when code from a first logical VM is invoking a remote method of a second logical VM:

wrapping each argument of the remote method when each argument is determined to be a remote object, wherein the first logical VM is associated with a first set of related code that are to be terminated together if misbehaving and the second logical VM is associated with a second set of related code that are to be terminated together if misbehaving, the first set of related code differing from the second set of related code;

copying each argument of the remote method when each argument is determined not to be a remote object;

invoking the remote method using each wrapped or copied argument;

wrapping the result of the invoked remote method when the result is determined to be a remote object;

copying the result of the invoked remote method when the result is determined not to be a remote object;

returning the wrapped or copied result only when an invocation thread associated with invoking the remote method of the second logical VM is not being terminated; and throwing an exception on the remote method of the second logical VM when the invocation thread associated with invoking the remote method of the second logical VM is being terminated.

18. A computer system as recited in claim 17, wherein the argument or the result is a remote object when its declared class implements a remote marker interface.

19. A computer system as recited in claim 17, wherein the result is only wrapped or copied when an invocation thread associated with invoking the remote method is not being terminated.

20. A computer system as recited in claim 19, wherein wrapping the argument or the result includes:

creating a wrapper object for the argument or the result and remembering an association between the wrapper object and the argument or the result when a wrapper object has not already been created; and finding the wrapper object for the argument or the result based on a previous association between the argument or the result and the wrapper object when the wrapper object has already been created.

21. A computer system as recited in claim 20, wherein creating the wrapper object for the argument or the result includes:

finding or generating a remote stub class;

creating an instantiation of the remote stub class; and setting a data member within the remote stub class to refer to the argument or the result.

22. A computer system as recited in claim 21, wherein generating the remote stub class includes:

generating a class name;

adding a method implementation for each method of a class of the argument or result being wrapped into a class definition array; and remember an association between the class and the remote stub class.

23. A computer system as recited in claim 22, wherein finding the remote stub class is based on a previously remembered association between a class and the remote stub class.

24. A computer system as recited in claim 17, wherein copying each of the argument or the result includes:

serializing each argument or the result into a byte array when the each argument or the result implements serialization;

deserializing each argument or the result with respect to a target class loader associated with code that is using the copy of each argument or the result when the each argument or the result implements serialization;

implementing a failure process when the each argument or the result does not implement serialization.

25. A method as recited in claim 1, wherein the first set of related code of the first logical VM is assigned to a first protection domain and the second set of related code of the second logical VM is assigned to a second protection domain that differs from the first protection domain.

26. A computer readable medium as recited in claim 9, wherein the first set of related code of the first logical VM is assigned to a first protection domain and the second set of related code of the second logical VM is assigned to a second protection domain that differs from the first protection domain.

27. A computer system as recited in claim 17, wherein the first set of related code of the first logical VM is assigned to a first protection domain and the second set of related code of the second logical VM is assigned to a second protection domain that differs from the first protection domain.

* * * * *